United States Patent Office 3,513,640
Patented May 26, 1970

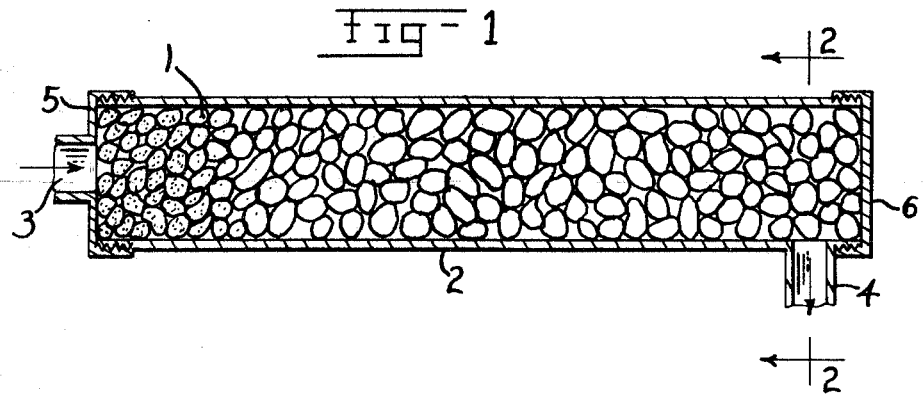
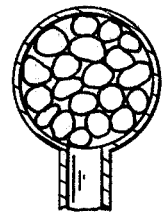
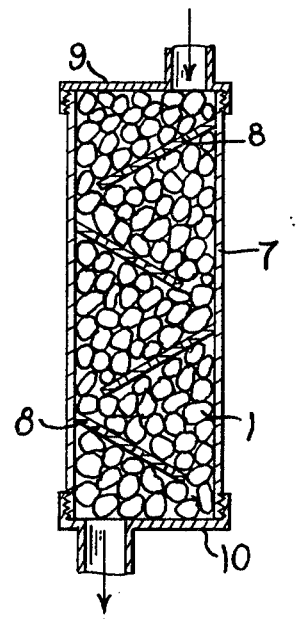
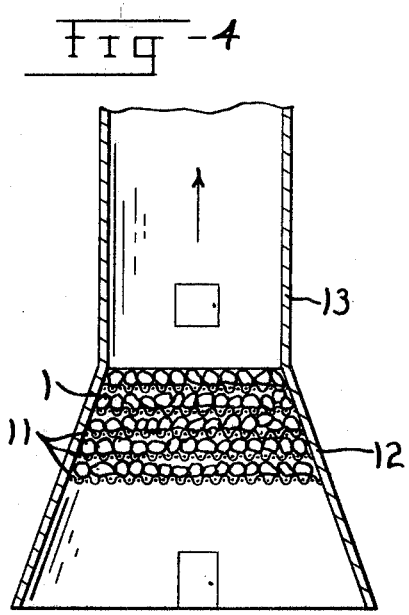

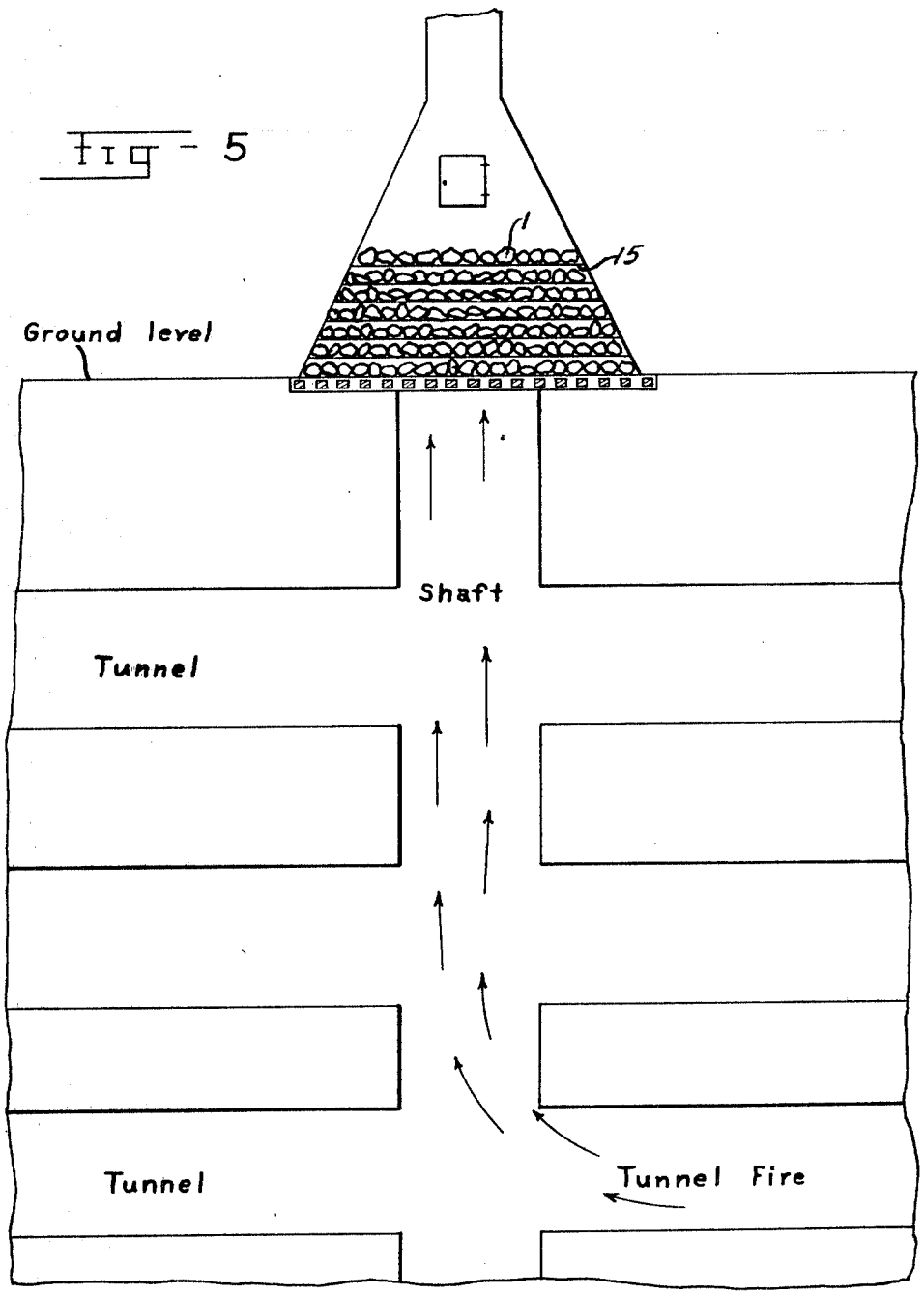

3,513,640
TREATMENT OF PUMICE FOR USE IN FILTERING OUT OBNOXIOUS CONTENTS OF COMBUSTION GASES
Anthony Moliskey, Newport, Wash., assignor of one-third each to Donald V. Meis and Earl A. Waring, both of Newport, Wash.
Filed Aug. 4, 1969, Ser. No. 847,040
Int. Cl. B01d 39/06
U.S. Cl. 55—524                 3 Claims

ABSTRACT OF THE DISCLOSURE

Pumice stone found naturally in many parts of the world is sized to particles or lumps of the desired dimensions, for example, lumps ranging from one-quarter inch through to one inch through. The lumps are washed with plain water to remove dust and water soluble materials and then dried. The lumps are then immersed in a dilute water solution of paraldehyde or formaldehyde to which is added about one to five parts citric acid to each ten parts by volume of paraldehyde or formaldehyde. The preferred concentration of formaldehyde or paraldehyde in the water solution is about one part by volume U.S.P. grade formaldehyde or paraldehyde in fifty thousand parts water. When the pumice is thoroughly wetted with the solution the pumice is then drained and used as a filter bed through which the combustion gases are passed.

SUMMARY OF INVENTION

Pumice stone found naturally at Chumault, Oreg., and in various other places is a highly porous volcanic rock. It is sometimes described as an "acid" vesicular glass formed from the froth on the surface of some particularly gaseous lavas. I have found that by treating lumps or particles of this rock with a dilute solution of paraldehyde or formaldehyde and citric acid in water, their capacity to remove the objectionable materials found in combustion gases from the burning of hydrocarbon fuels, such as coal, crude oil, gasoline and the like is greatly improved over the use of the untreated pumice.

GENERAL DESCRIPTION

In the drawings I have shown a variety of arrangements of filters for combustion gases in which the treated pumice is used.

FIG. 1 is a sectional view through a muffler for exhaust gases from an automobile engine with the treated pumice used as a filter.

FIG. 2 is a sectional view on the line 2—2 of FIG. 1;

FIG. 3 is a sectional view through a vertically arranged muffler for exhaust gases from a diesel engine of a truck wherein perforated baffles are used with the treated pumice filter;

FIG. 4 is a vertical sectional view through a smoke stack for a furnace showing layers of the treated pumice on grids in the base portion of the smoke stack;

FIG. 5 shows in section a diagrammatic representation of a mine shaft such as a coal mine with lateral tunnels wherein the treated pumice particles are used as a covering to filter the products of combustion coming out of the mine shaft when a fire breaks out in one or more of the tunnels.

In the example in FIGS. 1 and 2 of an automobile exhaust muffler the porous particles 1 are used as a filling in a tube 2 large enough to provide ample passage for the exhaust gases entering at 3 from the automobile engine. The gases pass through the bed of particles 1 being filtered through the particles so that unburned fuel and carbon are absorbed by the particles 1. The filtered gas, mostly carbon dioxide, escapes downward through the outlet 4. The inlet 3 has a cap portion 5 threaded on to the tube 2 and a closure 6 is threaded on the outlet end of the tube 2. The bed of particles 1 can be removed by taking off the closures 5 and 6. The tube 2 and the particles 1 can be cleaned by washing and the particles 1 can be retreated and used again.

The upright exhaust muffler shown in FIG. 3 embodies a tube 7 with baffles 8 provided with holes. Inlet and outlet connections 9 and 10 are provided at the top and bottom. The particles 1 fill the tube.

In FIG. 4 the particles 1 are carried on grids 11 in the base portion 12 of a smoke stack 13.

The particles can be used in a great variety of places where combustion gases or other gaseous products need to be filtered. Incinerators, both home and industrial can use the particles. In FIG. 5 there is an example of the use of a stack 4 placed over a mine shaft where a tunnel fire is exhausting its smoke through the shaft. Grids 15 support layers of the particles 1 over the mine shaft outlet.

In practicing the invention the pumice particles are first washed free of loose dust and the water soluble materials are removed in washing with plain water. The cleaned pumice particles are allowed to drain sufficiently to remove most of the wash water from the pores and passages within the individual particles. It is not necessary that the particles be "bone dry."

The cleaned pumice particles are preferably carried through a tank of a dilute water solution of either paraldehyde ($C_6H_{12}O_3$) or formaldehyde H—CHO and citric acid. While more concentrated water solutions can be used, I find that one part by volume of paraldehyde or one part by volume of formaldehyde U.S.P. grade in about forty to fifty thousand parts of water is enough. To this solution is added one part to five parts U.S.P. grade citric acid for each ten parts of paraldehyde or formaldehyde by volume. I have found that in the filtering of exhaust from an engine such as a diesel type engine burning crude oil it is best to use pumice particles that have been treated with a solution using four or five parts citric acid for each ten parts by volume of the paraldehyde or formaldehyde in the solution. For filtering of exhaust from a gasoline burning engine the treating solution for the pumice particles may contain only about one part citric acid to ten parts of the paraldehyde or formaldehyde by volume. The pumice particles are held immersed in the solution long enough to substantially replace the air in the pores of the pumice particles. The particles may be agitated, if desired, while in the solution to hasten the penetration of the solution into the particles. The pumice particles are then withdrawn and drained to remove the excess solution from the lumps, the pores of the lumps retaining some of the liquid therein.

I have found that I can use either the paraldehyde or formaldehyde and citric acid solution quite successfully and the treated particles retain their ability to filter out obnoxious vapors and gases for several months with no apparent deterioration. I find that these treated pumice particles are particularly effective in filtering out such products as carbon particles and unburned gas, including carbon monoxide. The capacity of the treated pumice to capture and hold these substances is much greater than that of the untreated pumice.

I claim:

1. Preparation of natural pumice for filtering purposes comprising:
    (a) washing lumps of pumice of varying sizes in water to remove loose dust and water soluble materials;
    (b) drying the washed lumps so the pores thereof are substantially free of water;
    (c) filling the pores of the lumps with a dilute water solution of an aldehyde from the group comprising paraldehyde and formaldehyde, and citric acid; and
    (d) draining the solution not retained in the lumps.

2. The method defined in claim 1 wherein the ratio of water to aldehyde by volume in the solution is of the order of 50,000 to 1 and the ratio of citric acid to aldehyde by volume is of the order of one to five parts citric acid per ten parts aldehyde.

3. A filter material for gases of combustion comprising an aggregate of lumps of natural pumice substantially free of dust;
    the pores of the lumps of pumice being at least partially filled with a dilute water solution of an aldehyde from the group comprising paraldehyde and formaldehyde, and citric acid.

References Cited

UNITED STATES PATENTS 2,978,064  4/1961  Deaver _____ 55—387

OTHER REFERENCES

Yoe et al.: "Pumice Impregnated With Anhydrous Magnesium Perchlorate as a Drying Agent," June 1928, Industrial and Engineering Chemistry, pp. 656–57, vol. 20, No. 6.

FRANK W. LUTTER, Primary Examiner

V. H. GIFFORD, Assistant Examiner

U.S. Cl. X.R.

60—29; 252—259.5